(12) United States Patent
Smith et al.

(10) Patent No.: US 9,366,762 B2
(45) Date of Patent: Jun. 14, 2016

(54) DETECTION OF DECEPTIVE NAVIGATION SIGNAL

(75) Inventors: Christopher B. Smith, Mico, TX (US); Michael A. Koets, San Antonio, TX (US); Michael D. Lillywhite, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 1191 days.

(21) Appl. No.: 13/283,431

(22) Filed: Oct. 27, 2011

(65) Prior Publication Data
US 2015/0070212 A1    Mar. 12, 2015

(51) Int. Cl.
*G01S 19/21* (2010.01)

(52) U.S. Cl.
CPC ............... *G01S 19/215* (2013.01); *G01S 19/21* (2013.01)

(58) Field of Classification Search
CPC ............................... G01S 19/21; G01S 19/215

USPC ...................................................... 342/357.59
See application file for complete search history.

(56) References Cited

U.S. PATENT DOCUMENTS

| | | | |
|---|---|---|---|
| 4,746,924 A * | 5/1988 | Lightfoot ....................... 342/453 |
| 5,563,917 A * | 10/1996 | Sheynblat ...................... 375/346 |
| 6,331,835 B1 * | 12/2001 | Gustafson et al. ........ 342/357.59 |
| 7,106,251 B2 * | 9/2006 | Schmid et al. ................. 342/464 |
| 7,555,262 B2 * | 6/2009 | Brenner ........................ 455/12.1 |
| 7,623,068 B2 | 11/2009 | Powell et al. |
| 7,800,533 B2 | 9/2010 | Harper et al. |
| 7,940,213 B2 * | 5/2011 | Harper et al. ............ 342/357.59 |
| 8,934,859 B2 * | 1/2015 | Dickman et al. .............. 455/296 |

\* cited by examiner

*Primary Examiner* — Frank J McGue
(74) *Attorney, Agent, or Firm* — Livingston Law Firm

(57) ABSTRACT

A method and device for detecting the presence of a deception scheme intended to thwart a satellite navigation system (SNS). A detector receives "receiver measurements" of various types from the SNS receiver. It conditions these values, so that they may be readily used by a process that determines whether the receiver is operating in a statistically normal state.

7 Claims, 2 Drawing Sheets

DETECTION OF DECEPTIVE NAVIGATION SIGNAL

GOVERNMENT LICENSE RIGHTS

The U.S. Government has a paid-up license in this invention and the right in certain circumstances to require the patent owner to license others on reasonable terms as provided for by the terms of Prime Contract No. N00178-04-D-4016, Subcontract No. 192725 awarded by the United States Naval Air Systems Command.

TECHNICAL FIELD OF THE INVENTION

This invention relates to satellite navigation systems (SNS's), and more particularly, to detecting when the SNS is being deceived.

BACKGROUND OF THE INVENTION

Satellite navigation systems (SNS's) allow small electronic receivers to determine their location (longitude, latitude, and altitude) to within a few meters using timing signals transmitted along a line of sight by radio from satellites. One example of a satellite navigation system is the Global Positioning System (GPS). Several other SNS's have been or are being developed, such as the Glonass (Russia) and Galileo (Europe) satellite navigation systems.

SNS's have three parts: the space segment, the user segment, and the control segment. The space segment consists of a number of satellites, each in its own orbit above the Earth. The user segment consists of small receivers, which can be hand-carried or installed on vehicles, such as aircraft, ships, tanks, submarines, cars, and trucks. The control segment consists of ground stations that make sure the satellites are working properly.

In operation, SNS satellites each broadcast a signal that contains the orbital parameters of the satellite and a means of determining the precise time the signal was transmitted. The satellite uses an atomic clock to maintain synchronization with all the satellites in the constellation. An SNS receiver compares the time of broadcast encoded in the transmission with the time of reception measured by an internal clock, thereby measuring the time-of-flight to the satellite. Several such measurements can be made at the same time to different satellites, allowing the receiver's position (location) to be calculated in real time using an adapted version of trilateration.

SNS deception schemes have been developed for deceiving satellite navigation receivers into calculating erroneous geolocations. U.S. Pat. No. 6,396,432, entitled "Method and Apparatus for the Deception of Satellite Navigation" describes one such deception scheme.

To counter SNS deception schemes, methods have been developed to detect the presence of the deception scheme. U.S. Pat. No. 7,623,068 describes a method of using certain data associated with receiver calculations to detect a deceptive scheme.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
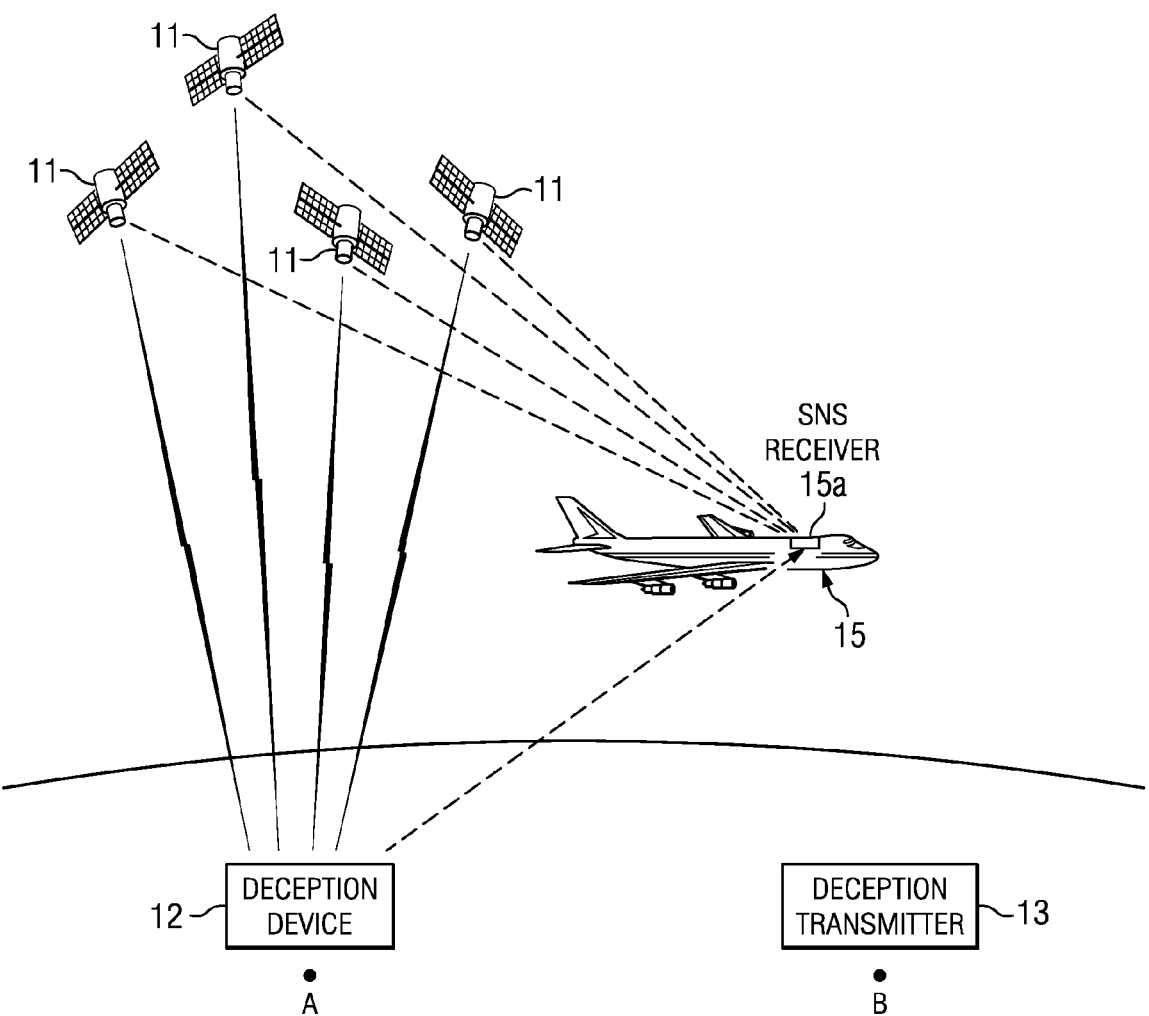
FIG. 1 illustrates one example of an SNS deception scheme.

FIG. 1 illustrates one example of a satellite navigation system (SNS) deception scheme, and is therefore an example of the context of the present invention. In the absence of the invention described herein, an SNS receiver 15a aboard a "victim" airplane 15 is being deceived into incorrectly reporting its own location.

The satellite navigation system has satellites 11, which transmit navigation signals visible to a deception device 12 at Location A. Deception device 12 receives these signals and re-transmits them to a deception transmitter 13 at Location B.

At Location B, the aircraft 15 is attempting geolocation using its on-board SNS receiver 15a. Because of the deception scheme, SNS receiver 15a is deceived into detecting the location information of Location A, or depending upon the scheme used, some third location.

An example of an SNS deception system of this type is described in U.S. Pat. No. 6,396,432, referenced in the Background. A satellite antenna (such as one used by deception device 12) receives satellite signals at Location A. These satellite signals are amplified and re-transmitted to Location B. Because the deception signal is amplified, it is incident on the victim receiver 15a with a slight power advantage over the signals directly from the satellites 11. The effect of the deception signal is to cause the SNS receiver 15a to report an incorrect location.

The effect of this deception method is particularly insidious because a conventional SNS receiver such as receiver 15a, is unable to detect that the deception is occurring. Although an operator observing the computed (false) position of the receiver might be able to detect that the computed position, heading or speed is inconsistent with the receiver's actual dynamics, this approach to detection is unreliable.

The counter-deception method described herein is intended to provide the victim's navigation receiver 15a with a means to detect the presence of the deception signal. As explained below, it uses a non-linear statistical classifier to continually test the integrity of the receiver's computed location. If a deception signal can be detected, its deleterious effects can be reduced.

For purposes of this description, the navigation system is described in terms of the GPS system, which has 24 satellites tracked by a world-wide network of monitor stations. The tracking data is sent to a master control station that continuously updates position and clock estimates for each satellite. The updated data is then uplinked to the satellite via one of several ground antennas. Each GPS satellite takes 12 hours to orbit the Earth. Each satellite is equipped with an accurate clock to let it broadcast signals coupled with a precise time message. A GPS receiver receives the satellite signal, which takes a measurable amount of time to reach the receiver. The difference between the time the signal is sent and the time it is received, multiplied by the speed of light, enables the GPS receiver to calculate the distance to the satellite. To measure precise latitude, longitude, and altitude, the GPS receiver measures the time it took for the signals from four separate satellites to arrive.

During calculation of a position solution, the SNS receiver 15a produces various mathematical values. These values include position, velocity, receiver clock bias, receiver clock drift, gain, carrier phase values, carrier-to-noise ratios, pseudoranges, Doppler shifts, Doppler residuals, and pseudorange residuals. For purposes of this description, these values are referred to collectively as "receiver measurements". Some of these receiver measurements may be specific to a channel, and some others may be specific to a receiver. The values listed in plural are channel-level measurements, in other words, for example, there is a pseudorange measurement associated with each satellite being tracked.

Figure 2:
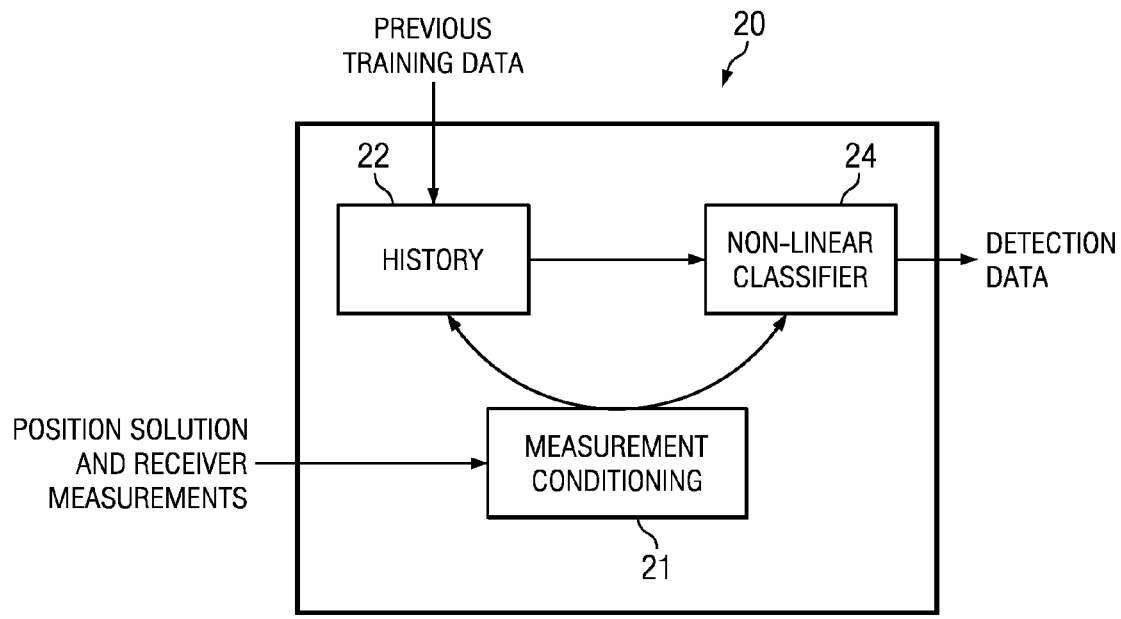
FIG. 2 illustrates a deception detector used to detect an SNS deception scheme.

FIG. 2 illustrates a deception detector 20 designed to receive the receiver measurements from receiver 15a and to use that data to detect the presence of a deceptive signal. Typically, detector 20 is located in close proximity to receiver 15a, and receives data from receiver 15a via a wired connection. Detector 20 can be implemented with one or more appropriate processing devices, memory, other hardware and software to implement any one or some combination of the methods described below. Detector 22 is typically implemented in software associated with one or more microprocessors or other controllers. In general, a reference to a particular process for detecting deception represents the programming for detector 20 as used to implement the function. As explained below, detector 20 also has memory so that currently calculated values can be monitored and compared to stored values.

As explained below, a significant feature of deception detector 20 is that it requires no data other than the measurement data available from receiver 15a. Specifically, it does not require data representing the velocity of the receiver 15a nor does it require a stable clock.

The data received by detector 20 from receiver 15a includes at least two of the various types of "receiver measurement" data described above. In the example of this description, detector 20 receives five types of receiver measurement values: position, gain, carrier-to-noise ratio, Doppler shift, and pseudorange. The method may be implemented with at least two types of the receiver measurements values, but any combination of these five types as well as other types may be used.

Each value is a "current" value in the sense that for real time geolocation, the detector 20 processes the measurement data associated with a current position calculation. This data is continually received by detector 20, at periodic intervals, for example as frequent as every position calculation made by receiver 15a.

The receiver measurement data is delivered to a conditioning unit 21, which performs certain calculations to prepare the data for input to the classifier 24. As used herein, "conditioning" means transforming the receiver measurement values to values that will facilitate statistical comparisons.

Figure 3:
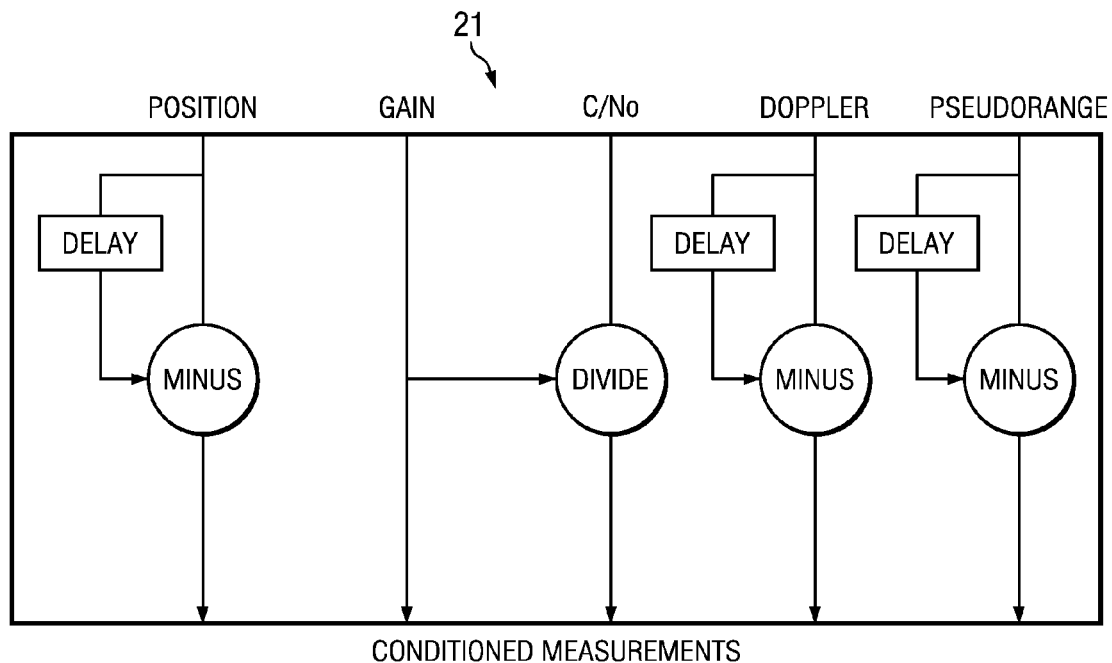
FIG. 3 illustrates the receiver measurement conditioning unit of FIG. 2 in further detail.

FIG. 3 illustrates conditioning unit 21 in further detail. In the example of FIG. 3, conditioning unit 21 separately processes each of the five types of receiver measurement inputs: the position solution, the gain, the carrier-to-noise ratio, the Doppler shift value, and the pseudorange value.

As illustrated, most of these receiver measurement values undergo a conditioning process. For example, for conditioning position values, each current position solution is subtracted from the next previous position solution to obtain a position difference value. Doppler shift and pseudorange values are also conditioned by differencing, thereby obtaining Doppler and pseudorange difference values. Each current carrier-to-noise ratio is conditioned by dividing it by the current gain value. Gain values are used without further processing. The output of the conditioning process is a set of conditioned receiver measurement values.

For channel-level measurements, the conditioning process may involve receiver measurements from more than one channel. Modern receivers can have 50 or more channels. The number of channels actually tracking satellites depends on the number of satellites in view, but for a complete three-dimensional position solution, at least four satellites are tracked. Often the receiver will track more satellites than are used in a solution, leaving out satellites with poor signal quality. In one embodiment, the method processes receiver measurements and statistics on all satellites, but focuses on those used in the position solution.

For channel-level measurements, each channel measurement is conditioned, such as when dividing the gain for a channel by the carrier-to-noise ratio measured for the satellite being tracked on that channel. As indicated below, the statistical normal could be referenced to all channels (satellites) or to a particular channel. The method that works best may depend on the receiver architecture.

Referring again to FIG. 2, history unit 22 stores previous conditioned measurement values. It continually receives current conditioned measurement values from conditioning unit 21.

Non-linear classifier 24 receives conditioned receiver measurement values from conditioning unit 21. After the time of each new position solution (or at some other predetermined or arbitrary interval), classifier 24 tests the conditioned receiver measurement values against a statistical description of normal for the receiver.

More specifically, classifier 24 stores and performs a process, referred to herein as a "statistical normal process", that describes, models, or otherwise represents a statistically normal operating state of the receiver. This process uses conditioned receiver measurement values as inputs to determine whether normal representation of the receiver is satisfied. The process may be a simple comparison of current to stored values, application of a set of rules to combinations of values, an algorithm, or any other process that defines a statistical normal for the receiver.

Various methods can be used to derive a representation of the receiver's statistical normal and acceptable deviations. These methods can include, without limitation, calculations of means, averages, and standard deviations. Simple approaches might use a decision algorithm to map the input values to a threshold or even a set of thresholds on the various receiver measurements. More complicated approaches can use a more complex form of classifier, such as a neural network or support vector machine. In general, various statistical methods can be used to receive the conditioned measurement input data and map the data to some sort of decision space.

The use of multiple conditioned measurement types may result in a combination that is not normal. For example, conditioned measurements may each be within normal range when considered alone, but in combination may indicate an abnormal receiver state.

In this manner, the statistical normal for the receiver may be a function of numerous receiver measurement types concurrently. Reliance on more than one type of receiver measurement for statistical comparison results in a more reliable detection method.

The output of classifier 24 may be simply an indication that a deceptive signal is suspected. In more sophisticated embodiments, the type of detection might also be identified. In this case, history database 22 stores "training data" representing characteristics of the deception signal. Classifier 24 uses this data to identify the particular deception scheme. Because different deception schemes can cause different perturbations of the conditioned measurements, the conditioned measurement data can be used to identify the deception scheme.

The above-described method can monitor any number of receiver measurements. In other embodiments, fewer of the receiver measurements described in FIG. 3 may be used. Or, additional or other of the receiver measurements described elsewhere herein may be used. As described above, the receiver measurements include a number of values, some of which may be channel-specific or receiver-specific. Some of the receiver measurement values can be used in combination, for example, CMC (code minus carrier) values or drift-adjusted Doppler values (for a receiver with bad drift). Combinations such as differential carrier minus Doppler values or clock drift minus the derivative of clock bias can be used.

The method is useful for receiver measurements that do not necessarily have smooth progressions of change. Detection of a deceptive scheme is not necessarily based on a single threshold comparison.

What is claimed is:

1. A receiver system for a satellite navigation system (SNS), comprising:
   a navigation receiver operable to receive real and deception signals containing GPS data, and programmed to calculate a navigation solution;
   wherein the navigation solution comprises at least a position solution, and wherein the at least the following types of receiver measurement values are produced during calculation of the position solution: gain values, carrier-to-noise ratio values, and Doppler shift values;
   a deception detector having the following elements:
   memory for storing previously calculated receiver measurement values;
   a conditioning unit programmed to receive the position solution and the receiver measurement values from the navigation receiver, and to condition the position solution and the receiver measurement values by differencing time-delayed position solution values, dividing carrier-to-noise ratio values by gain values, and differencing time-delayed doppler shift values, thereby obtaining three types of conditioned values (position, carrier-to-noise, and Doppler shift); and
   a classifier unit programmed to receive the conditioned values from the conditioning unit and to determine for each type whether the conditioned values are within an associated normal deviation, and if not, to generate output data indicating that a deceptive signal is suspected.

2. The system of claim 1, wherein the classifier unit is further programmed to use the results of the process to identify the deception scheme.

3. The system of claim 1, wherein the receiver measurement values include values for multiple channels, and values for each channel are separately conditioned.

4. The system of claim 1, wherein the receiver measurement values further include one or more of the following types of receiver measurements: Doppler residuals, pseudorange residuals, velocity, receiver clock bias, or receiver clock drift.

5. The system of claim 1, wherein normal deviations are determined by comparison to a standard deviation.

6. The system of claim 1, wherein the classifier unit generates output if only one conditioned receiver measurement is not within normal deviation.

7. The system of claim 1, wherein the classifier unit generates output only if a combination of two or more conditioned receiver measurements are not within normal deviation.

* * * * *